United States Patent [19]

Nakagawa et al.

[11] Patent Number: 4,861,814

[45] Date of Patent: Aug. 29, 1989

[54] POLYOXYMETHYLENE COMPOSITIONS AND METHOD OF MANUFACTURING THE SAME

[75] Inventors: Nozomu Nakagawa, Fuji; Masaru Kubota, Fujinomiya; Shuichi Chino, Fuji, all of Japan

[73] Assignee: Polyplastics Co., Ltd., Osaka, Japan

[21] Appl. No.: 184,861

[22] Filed: Apr. 22, 1988

[30] Foreign Application Priority Data

Apr. 22, 1987 [JP]  Japan ................................. 62-99329

[51] Int. Cl.$^4$ ............................................... C08K 5/17
[52] U.S. Cl. .................................... 524/102; 524/238; 524/239; 524/291
[58] Field of Search ................ 524/239, 291, 102, 238

[56] References Cited

U.S. PATENT DOCUMENTS

| | | | |
|---|---|---|---|
| 3,880,804 | 4/1975 | Ishii et al. | 524/239 |
| 3,969,292 | 7/1976 | Wolters et al. | 524/291 |
| 4,035,338 | 7/1977 | Ishii et al. | 524/239 |
| 4,446,263 | 5/1984 | Bryant | 524/102 |
| 4,717,745 | 1/1988 | Ishii et al. | 524/102 |

*Primary Examiner*—Veronica P. Hoke
*Attorney, Agent, or Firm*—Nixon & Vanderhye

[57] ABSTRACT

A polyoxymethylene composition comprises an antioxidant of 0.05 to 5% by weight and a basic compound containing at least one tertiary nitrogen atom and a metallic salt of carboxylic acid in the same one molecule of 0.01 to 2% by weight based on polyoxymethylene.

11 Claims, No Drawings

POLYOXYMETHYLENE COMPOSITIONS AND METHOD OF MANUFACTURING THE SAME

The present invention relates to a polyoxymethylene composition exhibiting improved heat-resistance, and discoloration properties and reduced adhesion to metallic molds during molding.

PRIOR ART AND PROBLEMS TO BE SOLVED

Polyoxymethylene resins are polymerized from formaldehyde or cyclic oligomers thereof, that is, trioxane, or copolymerized from trioxane and comonomers, such as cyclic ethers and cyclic formals, and their ends are subjected to a stabilizing treatment. In addition, antioxidants and other heat stabilizers are added to polyoxymethylene so as to prevent it from decomposing.

Stereo-hindered phenol compounds or stereo-hindered amine compounds have been proposed as antioxidants added to the polyoxymethylene resins while polyamides, urea derivatives, hydrazine compounds, amidine compounds, hydroxides of alkaline metals or alkaline earth metals, salts of organic or inorganic acids and the like have been proposed as other heat stabilizers. However, a polyoxymethylene resin composite with these compounds incorporated therein is disadvantageous in that it changes color to a yellowish brown under the influence of heat and oxygen within the cylinder of a molding machine. Moreover fine particular substances (usually termed "mold deposits") are transferred to surfaces of the metallic mold over the course of a large number of molding cycles, resulting in a reduced surface luster of a subsequently molded products. Accordingly, various kinds of devices and proposals have been suggested but without achieving the desired satisfactory results.

MEASURES FOR SOLVING THE PROBLEMS

The present invention is based on the discovery that the use of the following group of compounds, together with antioxidants, exhibits a remarkable effect in terms of heat-resistance, discoloration and reduction of mold deposits (MD).

Thus the present invention relates to a polyoxymethylene composite comprising an antioxidant in an amount between 0.05 to 5% by weight and a basic compound containing a tertiary nitrogen atom and a metallic salt of carboxylic acid in the same molecule in an amount between 0.01 to 2% by weight. The present invention also relates to a method of manufacturing the polyoxymethylene composite, comprising adding the above components to molten polyoxymethylene.

The basic compound used in the present invention is a compound containing at least one tertiary nitrogen atom and a metallic salt of carboxylic acid in the same one molecule and represented by the following formula (1). It is preferable that all nitrogen atoms are a tertiary nitrogen atom.

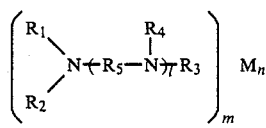

wherein at least one of $R_1$, $R_2$, $R_3$, $R_4$ is a carboxylic group represented by the following formula (2) and the rest are an alkyl group having 1 to 7 carbon atoms, $R_5$ is an alkylene group having 2 to 10 carbon atoms or an alkylene group having 1 to 3 ether bonds midway, M is at least one metal selected from alkaline metals or alkaline earth metals, L is an integer of 0 to 6, m is 1 or 2, n is an integer making the total valences of metal M equal to the total number of carboxylic groups in said basic compound.

wherein $R_6$ is an alkylene group having 1 to 6 carbon atoms and directly connected to a nitrogen atom in the formula (1).

This basic compound is for example a salt formed of at least one compound selected from the group consisting of N,N-dimethyl-glycine, N-methylimino-diacetic acid, nitrilo-triacetic acid, nitrilo-propionicacid, ethylene diamine tetraacetic acid, ethylene diamine tetrapropionic acid, diethylene triamine pentaacetic acid, triethylene tetramine hexaacetic acid, triethylene tetramine hexapropionic acid, cyclohexylene dinitrilo-tetraacetic acid, cyclohexylene dinitrilo-tetrapropionic acid and ethylene dioxy-bis (ethylamine)-N,N,N',N'-tetraacetic acid and at least one metal selected from the group consisting of lithium, sodium, potassium, rubdium, cesium, beryllium, magnesium, calcium, strontium and barium at a stoichiometric ratio. Salts formed of carboxylic acids, such as N-methylimino-diacetic acid, nitrilo-triacetic acid and ethylene diamine tetrapropionic acid, and an alkaline metal, such as lithium and sodium, or an alkaline earth metal, such as magnesium and calcium, are preferably used. In particular, salts formed of a carboxylic acid represented by the formula (1), wherein each of $R_1$, $R_2$, $R_3$, $R_4$ is a carboxylic group, and an alkaline metal are specifically effective. Particularly, ethylene diamine tetraacetic acid tetrasodium represented by (the following formula (3)) is most superior.

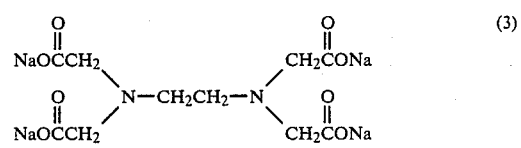

These basic stabilizers do not lead to the formation of colored products since the control together with the antioxidants the thermal decomposition of polyoxymethylene as a product. Accordingly, decompositon gas can be prevented from generating during the molding process while the basic stabilizers have the minimal sublimating and decomposing properties by themselves, thereby reducing the formation of mold deposits.

Antioxidants used in the present invention include hidered phenols and hindered amines. The preferred hindered phenols include 2,2'-methylene-bis(4-methyl-6-t-butylphenol), hexamethylene glycol-bis(3,5-di-t-butyl-4-hydroxyhydrocinnamate), tetrakis[methylene(3,5-di-t-butyl-4-hydroxyhydrocinnamate)]methane, triethylene glycol-bis-3-(3-t-butyl-4-hydroxy-5-methylphenyl)propionate, 1,3,5-trimethyl-2,4,6-tris(3,5-di-t-butyl-4-hydroxy-benzyl)benzene, n-octadecyl-3-(4-hydroxy-3,5-di-t-butylphenol)propionate, 4,4'-methylene-bis(2,6-di-t-butylphenol), 4,4'-butylidene-bis-(6-t-butyl-3-methyl-phenol), 2,2'-thiodiethyl-bis-[3-(3,5-di-t-butyl-4-hydroxyphenyl)propionate], di-stearyl-3,5-di-t- butyl-4-hydroxybenzylphosphonate and 2-t-butyl-6-(3-t-butyl-5-methyl-2-hydroxybenzyl)-4-methylphenylacrylate used singly or in combination. Of them, hexamethylene glycol-bis(3,5-di-t-butyl-4-hydroxyhydrocinnamate), tetrakis[methylene(3,5-di-t-butyl-4-hydroxyhydrocinnamate)]methane and triethylene glycol-bis-3-(3-t-butyl-4-hydroxy-5-methylphenyl)propionate are particularly preferred.

The hindered preferred amines include piperidine derivatives having a stereo-hindering group which include 4-acetoxy-2,2,6,6-tetramethylpiperidine, 4-stearoyloxy-2,2,6,6-tetramethylpiperidine, 4-acryloyloxy-2,2,6,6-tetramethylpiperidine, 4-methoxy-2,2,6,6-tetramethylpiperidine, 4-benzoyloxy-2,2,6,6-tetramethylpiperidine, 4-cyclohexyloxy-2,2,6,6-tetramethylpiperidine, 4-phenoxy-2,2,6,6-tetramethylpiperidine, 4-benzyloxy-2,2,6,6-tetramethylpiperidine, 4-(phenylcarbamoyloxy)-2,2,6,6-tetramethylpiperidine, bis(2,2,6,6-tetramethyl-4-piperidyl)oxalate, bis(2,2,6,6-tetramethyl-4-piperzyl)malonate, bis(2,2,6,6-tetramethyl-4-piperizyl)adipate, bis(2,2,6,6-tetramethyl-4-piperidyl)sebacate, bis(1,2,2,6,6-pentamethyl-piperidyl)cebacate, bis(2,2,6,6-tetramethyl-4-piperizyl)-terephthalate, 1,2-bis(2,2,6,6-tetramethyl-4-pyperidyloxy)ethane, bis(2,2,6,6-tetramethyl-4-piperizyl)hexamethylene-1,6-dicabamate, bis(1-methyl-2,2,6,6-tetramethyl-4-piperizyl)adipate, tris(2,2,6,6-tetramethyl-4-piperidyl)benzene-1,3,5-tricarboxylate and the like.

Also, high molecular piperidine derivatives are preferably used.

The antioxidant used in the present invention is added to polyoxymethylene in an amount between about 0.05 to 5% by weight, preferably 0.1 to 3% by weight, and the basic compound is added to polyoxymethylene in an amount between 0.01 to 2% by weight, preferably 0.03 to 1% by weight. In the case where these components are added below the minimum weight percentages noted above, insufficient effects are obtained. In the case where they are added in excess of the maximum weight percentages noted above, the beneficial effects, such as heat-resistance, are not improved in spite of their presence in large amounts. Instead, a discoloration tendency occurs, which is, of course, undesirable.

Any suitable technique to add and blend the compounds may be employed, e.g. melt blending. That is to say, the antioxidant and the above-described basic compound is added to polymethylene, (after subjecting its terminal end groups to a in an amount stabilizing treatment), of between 0.05 to 5% by weight and 0.01 to 2% by weight, respectively. The resulting mixture is melted and blended to obtain the composition. Furthermore, the above described basic compound and an antioxidant is added to crude polyoxymethylene. That is, the basic compound is added to polyoxymethylene (after stopping the polymerization) in which the end groups thereof have not been subjected to stabilizing treatment. The resulting mixture may thus be melted and blended in a uniaxial or biaxial extruder or similar apparatus (e.g. as disclosed in Japanese Patent Publication No. Sho 50-21514) provided with a vent hole within the temperature between 180° to 250° C. and a mean residence time of 1 minute or more.

The basic compound according to the present invention is added in the form of powder, but it may be added in the form of a 0.1 to 10%-aqueous solution.

According to the present invention, the basic compound serves not only as a stabilizer but also as a modifier for releasing unstabilized end portions from unstable crude polyoxymethylene and thereby transform the unstable polymer to a stabilized polymer.

The polyoxymethylene composition obtained by these methods can be used as a molding material as they are but known substances usually added to usual thermoplastic resins and thermo-setting resins, that is to say, plasticizers, ultraviolet ray absorbants, antistatic agents, surfactants, flame-retardants, coloring agents, such as dyestuffs and pigments, agents unguents for improving the fluidity and releasability, lubricants, crystallization promotors (nucleating agents) and the like can be suitably used according to particular end-use requirements. In addition, fibrous, plate-like and granular inorganic fillers, such as glass fibers, can be added to the composition of the present invention. It goes without saying also that other resins or high molecular substances can also be added to the composition of the present invention. cl PREFERRED EMBODIMENTS The present invention is below described with reference to the Examples and Comparative Examples.

E (%) designates a quantity of unstable end portions, which are decomposed by alkalies, and is represented by the following equation:

$$E = [(W_0-W)/W_0] \times 100(\%)$$

In the above described equation, $W_0$ designates a weight (about 5 g) of dry polyoxymethylene used in the measurement and W designates a weight of polyoxymethylene obtained by heating said dry polyoxymethylene in a 1 weight %-aqueous solution of ammonia of 500 ml for 30 minutes at 180° C. and then cooled followed by washing and drying the deposited polyoxymethylene.

In addition, the color tone of the composite was evaluated by maintaining a sample of about 10 g within a melt-indexer for 60 minutes at 200° C. and then measuring the color tone of the sample when molded in the form of a disc by means of a colorimeter. The evaluation is classified as shown in the following Table. A L-value represents the whiteness, wherein the larger value of L is preferable. In addition, a b-value represents the yellowness wherein the smaller value of b is preferable.

| Rank | |
| --- | --- |
| A | L-value: 86 or more; b-value: less than 1.0 |
| B | L-value: 85 or more; b-value: less than 3.0 |
| C | L-value: 82 or more; b-value: less than 6.0 |
| D | L-value: less than 82; b-value: 6.0 or more |

The heat-stability was evaluated by subjecting the sample to the heat treatment in the same manner as in the measurement of color tone and measuring the melt index (MI) value before and after the treatment. That is to say, the lower MI value after the residence time means that the thermal decomposition is reduced and the heat-resistance is superior.

Adhesion to a metallic mold during the molding cycle was evaluated by visually observing the stain of the metallic mold after the continuous molding of the polyoxymethylene composite sample under appointed conditions in an injection molding machine. The evaluation is represented by A, B, C which are defined as follows:

A—Not stained

B—Slightly stained
C—Stained

EXAMPLES 1, 2

An antioxidant [triethylene glycol-bis-3-(3-t-butyl-4-hydroxy-5-methylphenyl)propionate] of 0.5 parts by weight and a basic compound shown in Table 1 of 0.1 parts by weight were added to polyoxymethylene copolymer, which has MI-value of 9.0 and E of 1.0% and of which ends were subjected to the stabilizing treatment, of 100 parts by weight and the resulting mixture was molten and blended at 210° C. in the extruder to obtain pellets. The test results of the resulting compositions are shown in Table 1.

COMPARATIVE EXAMPLES 1, 2

Pellets were obtained in the same manner as in Examples 1, 2 excepting that the substances shown in Table 1 were added in place of the basic compounds shown in Examples 1, 2 at the ratio of 0.1% by weight. The test results of the resulting composite are shown in Table 1 together with those in Examples 1, 2.

EXAMPLES 3, 4

Antioxidants used in Examples 1, 2 and basic compounds shown in Table 2 in the form of a 5 weight %-aqueous solution were added to polyoxymethylene copolymer, which has MI-value of 8.6 and E of 2.5% and of which ends were not subjected to the stabilizing treatment, at a ratio of 0.5% by weight and 0.15% by weight and the resulting mixture was molten and blended at 210° C. and a pressure of a vent hole of 200 torr in a biaxial extruder provided with a vent hole to obtain pellets. The test results of the resulting compositions are shown in Table 2.

COMPARATIVE EXAMPLES 3, 4

The treatment was carried out in the same manner as in Examples 3, 4 except that the basic compounds added in the Examples were not added and the substances shown in Table 2 were added at a ratio of 0.15% by weight in the form of a 5% aqueous solution to obtain pellets. The test results of the resulting compositions are shown in Table 2 together with those in Examples 3, 4.

EXAMPLES 5 to 8

Antioxidants added in Examples 1, 2 and basic compounds shown in Table 3 were added to polyoxymethylene copolymer, which has MI-value of 8.6 and E of 2.5% and of which ends are not subjected to the stabilizing treatment, at a ratio of 0.7% by weight and 0.1% by weight, respectively, and the resulting mixture was molten and stirred for 15 minutes in a Laboplastmil® mixer while maintaining a suction pressure of 50 torr. The test results of the resulting composition are shown in Table 3.

COMPARATIVE EXAMPLES 5 to 8

The treatment was carried out in the same manner as in Examples 5 to 8 except that the substances shown in Table 3 was added at a ratio of 0.1% by weight in place of the basic stabilizers added in Examples 5 to 8. The test results of the resulting compositions are shown in Table 3 together with those in Examples 5 to 8.

TABLE 1

| | | Additive (basic compound) | Color tone | MI | MD |
|---|---|---|---|---|---|
| Example | 1 | Ethylenediamine tetraacetic acid tetrasodium | A | 10.4 | A |
| | 2 | Nitrilo-triacetic acid trisodium | A | 12.7 | A |
| Comparative Example | 1 | Calcium starate | D | 16.0 | C |
| | 2 | Polyamide* | C | 12.8 | B |

*Nylon 6, 66, 610 copolymer

TABLE 2

| | | Additive (basic compound) | Color tone | MI | MD | E (%) |
|---|---|---|---|---|---|---|
| Example | 3 | Ethylene diamine tetraacetic acid tetrasodium | A | 10.4 | A | 0.8 |
| | 4 | Triethylene tetramine hexaacetic acid hexasodium | A | 10.7 | A | 0.3 |
| Comparative Example | 3 | Triethylamine | C | 16.1 | C | 0.7 |
| | 4 | — | A | 16.6 | C | 1.6 |

TABLE 3

| | | Additive (basic compound) | Color tone | MI | MD | E (%) |
|---|---|---|---|---|---|---|
| Example | 5 | Ethylene diamine tetraacetic acid tetrasodium | A | 10.3 | A | 1.0 |
| | 6 | Nitrilo-triacetic acid trisodium | A | 12.8 | A | 0.9 |
| | 7 | N—methylimino-diacetic acid disodium | A | 11.8 | B | 1.0 |
| | 8 | Triethylene tetramine hexaacetic acid hexasodium | B | 10.9 | A | 0.3 |
| Comparative Example | 5 | Imino-diacetic acid disodium | C | 10.8 | A | 0.3 |
| | 6 | Magnesium hydroxide | B | 13.8 | C | 1.1 |
| | 7 | Sodium carbonate | D | 10.3 | C | 0.3 |
| | 8 | — | A | 16.6 | C | 2.1 |

As is evident from the above description and Examples, according to the present invention, polyoxymethylen can significantly be improved in terms of heat-stability, reduction of metallic mold staining after long-term continuous molding, significantly reducing the discoloration even after high-temperature treatment during molding, and maintaining the superior color tone. Therefore, according to the invention, polyoxymethylene resin compositions superior in quality are obtained.

What is claimed is:

1. A polyoxymethylene composition comprising, (i) between 0.05 to 5% by weight, based on polyoxymethylene, of an antioxidant, and (ii) between 0.01 to 2% by weight, based on polyoxymethylene, of a basic compound containing, in the same molecule, at least one tertiary nitrogen atom and a metallic salt of carboxylic acid.

2. A polyoxymethylene composition as set forth in claim 1, in which the basic compound is a compound represented by the following Formula I:

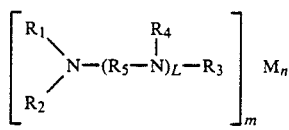 (Formula I)

wherein at least one of $R_1$, $R_2$, $R_3$, and $R_4$ is a carboxylic group represented by the following Formula II:

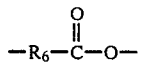 (Formula II)

wherein $R_6$ is an alkylene group having 1 to 6 carbon atoms and is directly connected to the nitrogen atom in the Formula I, and the remainder of $R_1$, $R_2$, $R_3$, and $R_4$ are an alkyl group having 1 to 7 carbon atoms, $R_5$ is an alkylene group having 2 to 10 carbon atoms or an alkylene group having 1 to 3 ether bonds midway, M is at least one metal selected from the group consisting of alkaline metals or alkaline earth metals, L is an integer from 0 to 6, m is 1 or 2, n is an integer making the total valences of metal M equal to the total number of carboxylic groups in said basic compound.

3. A polyoxymethylene composition as set forth in claim 1 in which the basic compound is a salt formed of at least one organic acid selected from the group consisting of N-methylimino-diacetic acid, nitrilo-triacetic acid, ethylene diamine tetraacetic acid, ethylene diamine tetrapropionic acid, triethylene tetramine hexaacetic acid and ethylene dioxy-bis(ethylamine)-N,N,N',N'-tetraacetic acid and at least one metal selected from the group consisting of lithium, sodium, magnesium and calcium at a stoichiometric ratio.

4. A polyoxymethylene composition as set forth in claim 1 or claim 3, in which the antioxidant is a hindered phenol and/or a hindered amine.

5. A polyoxymethylene composition as set forth in claim 2, wherein the basic compound is a salt formed from a stoichiometric ratio of at least one organic acid selected from the group consisting of N-methylamino-diacetic acid, nitrilo-treacetic acid, ethylene diamine tetraacetic acid, ethylene diamine tetrapropionic acid, triethylene tetramine hexaacetic acid and ethylene dioxy-bis(ethylamine)-N,N,N',N'-tetraacetic acid and at least one metal selected from the group consisting of lithium, sodium, magnesium and calcium.

6. A polyoxyethlene composition as set forth in claim 2 or claim 5, wherein the antioxidant is a hindered phenol and/or a hindered amine.

7. A method of manufacturing a polyoxymethylene composition comprising melt blending with 100 parts by weight of crude polyoxymethylene, (i) between 0.05 to 5 parts by weight of an antioxidant, and (ii) between 0.01 to 2 parts by weight of a basic compound containing, in the same molecule, at least one tertiary nitrogen atom and a metallic salt of carboxylic acid.

8. A method of manufacturing a polyoxymethylene composition as set forth in claim 7, in which the basic compound is a compound represented by the following Formula I:

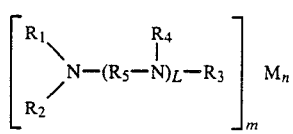 (Formula I)

wherein at least one of $R_1$, $R_2$, $R_3$, and $R_4$ is a carboxylic group represented by the following Formula II:

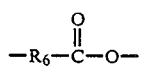 (Formula II)

wherein $R_6$ is an alkylene group having 1 to 6 carbon atoms and is directly connected to the nitrogen atom in the Formula I, and the remainder of $R_1$, $R_2$, $R_3$, and $R_4$ are an alkyl group having 1 to 7 carbon atoms, $R_5$ is an alkylene group having 2 to 10 carbon atoms or an alkylene group having 1 to 3 ether bonds midway, M is at least one metal selected from the group consisting of alkaline metals or alkaline earth metals, L is an integer from 0 to 6, m is 1 or 2, n is an integer making the total valences of metal M equal to the total number of carboxylic groups in said basic compound.

9. A method of manufacturing a polyoxymethylene composition as set forth in claim 12 or claim 8, wherein the basic compound is a salt formed from a stoichiometric ratio of at least one organic acid selected from the group consisting of N-methylimino-diacetic acid, nitrilo-triacetic acid, ethylene diamine tetraacetic acid, nitrilo-triacetic acid, ethylene diamine tetraacetic acid, ethylene diamine tetrapropionic acid, triethylene tetramine hexaacetic acid and ethylene dioxy-bis(ethylamine)-N,N,N',N'-tetraacetic acid, and at least one metal selected from the group consisting of lithium, sodium, magnesium and calcium.

10. A method of manufacturing a polyoxymethylene composition as set forth in claim 9, wherein the antioxidant is a hindered phenol and/or a hindered amine.

11. A method of manufacturing a polyoxymethylene composition as set forth in claim 7 or claim 8, wherein the antioxidant is a hindered phenol and/or a hindered amine.

* * * * *

UNITED STATES PATENT AND TRADEMARK OFFICE
CERTIFICATE OF CORRECTION

PATENT NO. : 4,861,814

DATED : August 29, 1989

INVENTOR(S) : Nakagawa et al

It is certified that error appears in the above-identified patent and that said Letters Patent is hereby corrected as shown below:

Column 1, line 29, after "Moreover" insert a comma (,) and after "fine" delete "particular" and insert --particulate--;
        line 56, before "molecule" delete "one";
        line 57, after "are" delete "a";
        line 58, change "atom" to --atoms--.

Column 2, line 49, delete "control together with the";
        line 50, delete "antioxidants the thermal";
        line 51, after "Accordingly," insert --the generation of--;
        line 52, after "prevented" delete "from generating" and insert --may be controlled.--

Signed and Sealed this

Eleventh Day of September, 1990

Attest:

HARRY F. MANBECK, JR.

*Attesting Officer*      *Commissioner of Patents and Trademarks*